(12) United States Patent
Ranganathan et al.

(10) Patent No.: US 8,297,050 B2
(45) Date of Patent: Oct. 30, 2012

(54) NOZZLE DIFFUSER MIXER

(75) Inventors: Raj P. Ranganathan, Rochester Hills, MI (US); Sherif H. El Tahry, Troy, MI (US); Robert D. Straub, Lowell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 829 days.

(21) Appl. No.: 12/171,865

(22) Filed: Jul. 11, 2008

(65) Prior Publication Data

US 2010/0005791 A1    Jan. 14, 2010

(51) Int. Cl.
*F01N 1/00* (2006.01)
*F01N 3/00* (2006.01)

(52) U.S. Cl. .............. 60/324; 60/286; 60/295; 60/297

(58) Field of Classification Search ............ 60/286, 60/295, 297, 319
See application file for complete search history.

(56) References Cited

U.S. PATENT DOCUMENTS

| | | | |
|---|---|---|---|
| 4,116,383 A * | 9/1978 | Johnson | 239/8 |
| 6,497,137 B2 * | 12/2002 | Helgeson | 73/23.31 |
| 7,328,572 B2 * | 2/2008 | McKinley et al. | 60/286 |
| 7,533,520 B2 * | 5/2009 | Cheng et al. | 60/286 |
| 7,908,847 B2 * | 3/2011 | Crawley et al. | 60/297 |
| 8,173,088 B2 * | 5/2012 | Makartchouk et al. | 423/213.2 |
| 2009/0044524 A1 * | 2/2009 | Fujino | 60/303 |
| 2009/0165447 A1 * | 7/2009 | Hiranuma et al. | 60/295 |
| 2010/0170229 A1 * | 7/2010 | Venghaus et al. | 60/295 |

FOREIGN PATENT DOCUMENTS

| | | | |
|---|---|---|---|
| CN | 101180456 A | | 5/2008 |
| WO | WO 2006122581 A1 * | | 11/2006 |

* cited by examiner

*Primary Examiner* — Kenneth Bomberg
*Assistant Examiner* — Dapinder Singh
(74) *Attorney, Agent, or Firm* — Cantor Colburn LLP

(57) ABSTRACT

Exemplary embodiments of the present invention are directed towards an apparatus and method for control of fluid flow through a conduit of an exhaust system for an engine, particularly prior to an exhaust treatment device. In one embodiment, a fluid flow control device for receiving and guiding exhaust gas from an engine towards an exhaust gas treatment device is provided. The fluid flow control device includes a nozzle disposed within an exhaust conduit of the engine. The nozzle includes an inlet opening and an outlet opening for forming a first flow path through the nozzle. The nozzle is spaced from the exhaust conduit for forming a second flow path between the nozzle and the exhaust conduit. The fluid flow control device also includes an injector disposed adjacent the nozzle. The injector may be oriented to direct a pressurized fluid to the first or second flow path.

18 Claims, 9 Drawing Sheets

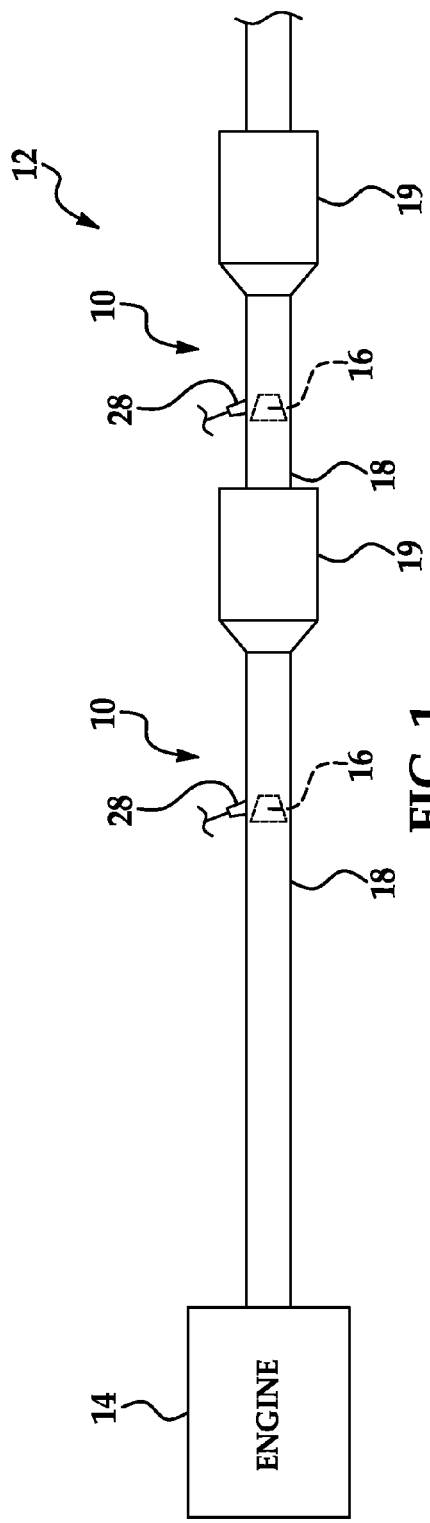
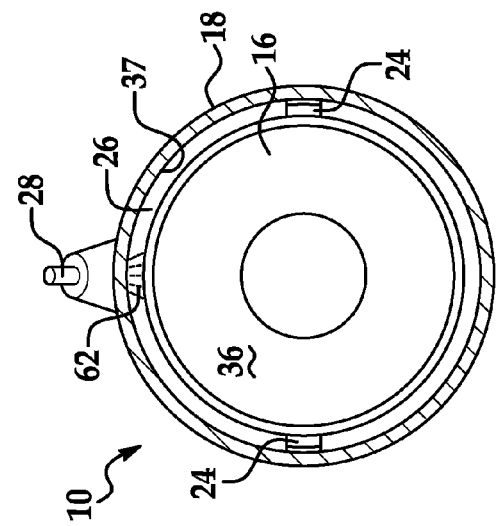
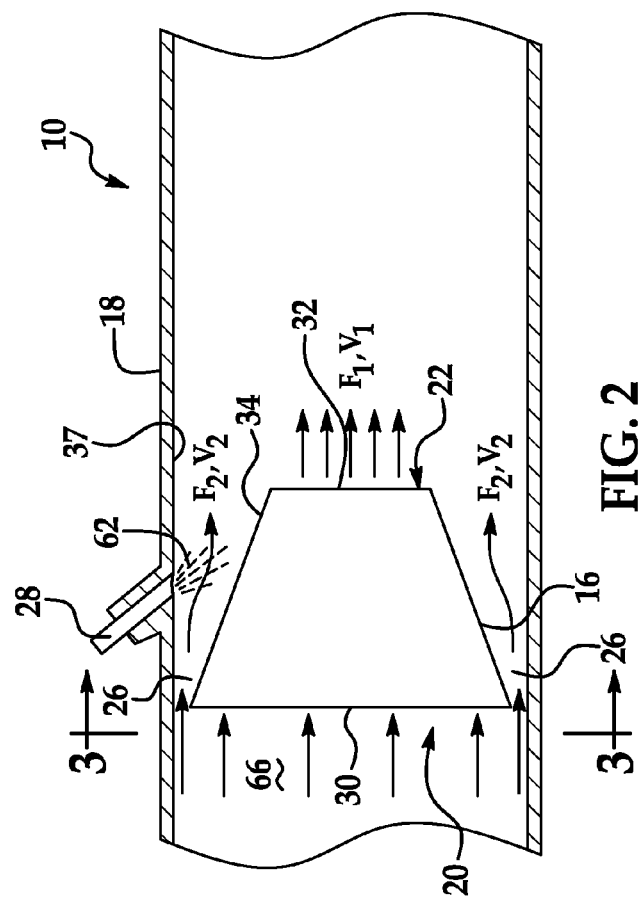
FIG. 1
FIG. 2
FIG. 3

NOZZLE DIFFUSER MIXER

FIELD OF THE INVENTION

Exemplary embodiments of the present invention are directed towards an apparatus and method for control of a fluid flow through a conduit of an exhaust system of an engine, particularly prior to an exhaust treatment device.

BACKGROUND

Diesel exhaust after treatment involves the use of a selective catalyst reducer (SCR) and a diesel particulate filter (DPF) along with injection of urea-water solution and diesel fuel into the exhaust gas. The performance, durability and cost of these devices depend strongly on the evaporation and mixing of the injected fluid into the exhaust gas. The injected fluid can be a liquid, gas or a mix of both phases. Therefore, mixers are placed in the exhaust flow to maximize evaporation (if a liquid is being injected) and mixing of the injected fluid (both liquid and vapor phases) with the exhaust gas. However, certain mixers and mixing configurations, in use presently, are insufficient in the vaporization and mixing of the injected fluid, are complex in design and therefore difficult to manufacture and package, costly and/or generate unacceptable backpressure within the exhaust flow, e.g., the backpressure is the additional pressure drop in the exhaust system due to the introduction of the mixing device(s) and its negative consequences for engine performance such as power and fuel economy.

In view of the foregoing, an improved fluid mixer and evaporator having a relatively simple design, is easy to manufacture, has high durability and/or is low in cost while still maintaining relatively low or acceptable back pressure within the exhaust system is desired.

SUMMARY OF THE INVENTION

Exemplary embodiments of the present invention are directed towards an apparatus and method for control of fluid flow through a conduit of an exhaust system of an engine, particularly prior to an exhaust treatment device. In one embodiment, a fluid flow control device for receiving and guiding exhaust gas from an engine towards an exhaust gas treatment device is provided. The fluid flow control device includes a nozzle disposed within an exhaust conduit of the engine. The nozzle includes an inlet opening and an outlet opening for forming a first flow path through the nozzle. The nozzle is spaced from the exhaust conduit for forming a second flow path between the nozzle and the exhaust conduit. The fluid flow control device also includes an injector disposed adjacent the nozzle. The injector may be oriented to direct a pressurized fluid into the first or second flow path.

In another embodiment, an exhaust gas treatment system for an engine is provided. The exhaust gas treatment system includes an exhaust gas treatment device. The exhaust gas treatment system also includes a fluid flow control device located upstream from at least a portion of the exhaust gas treatment device. The fluid flow control device includes a nozzle disposed within an exhaust conduit. The nozzle includes an inlet opening and an outlet opening for forming a first flow path through the nozzle. The nozzle is spaced from the exhaust conduit for forming a second flow path between the nozzle and the exhaust conduit. The exhaust gas treatment system further includes an injector disposed adjacent the nozzle of the fluid flow control device. The injector is oriented to direct a pressurized fluid into the first or second flow path adjacent to the nozzle.

In still another embodiment, a method of dispersing an exhaust gas stream within an exhaust gas conduit of an engine is provided. The method includes: flowing a first portion of the exhaust gas through a nozzle disposed within the exhaust gas conduit to form a first flow path, the nozzle including an inlet opening and an outlet opening; flowing a second portion of the exhaust gas stream between the nozzle and the exhaust gas conduit to form a second flow path; and injecting fluid into the first flow path or the second flow path, the first portion of the exhaust gas, the second portion of the exhaust gas and the injected fluid combining upon passing the nozzle to form a mixture.

BRIEF DESCRIPTION OF THE DRAWINGS

Other features, advantages and details appear, by way of example only, in the following detailed description of embodiments, the detailed description referring to the drawings in which:

FIG. 1 illustrates a schematic view of an exhaust system of an engine;

FIG. 2 illustrates a cross-sectional view of a fluid control device according to an exemplary embodiment of the present invention;

FIG. 3 is a cross-sectional view taken along lines 3-3 show in FIG. 2;

DESCRIPTION OF THE EMBODIMENTS

Figure 4:
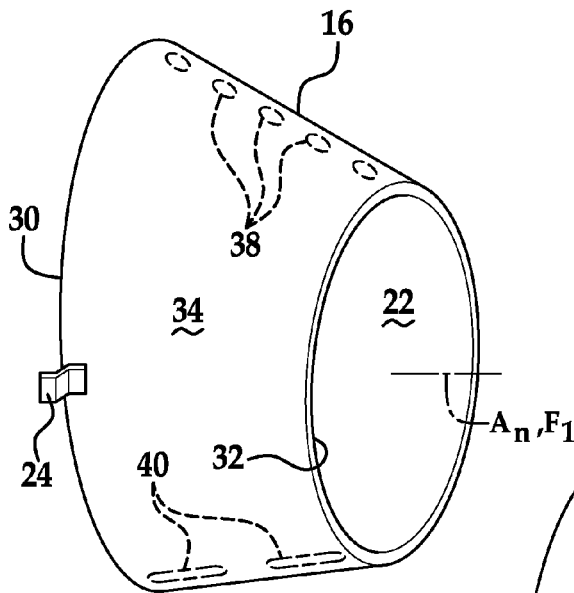
FIG. 4 is a perspective view of a nozzle according to an exemplary embodiment of the present invention.

Exemplary embodiments of the present invention provide a fluid control device for mixing and evenly distributing exhaust gas, and additives thereto, across a cross-sectional area of a conduit. In one particular embodiment, the fluid control device is further configured for mixing injected fluid (e.g., gas or liquid phase), such as urea solution, hydrocarbon fuel or otherwise, with the exhaust gas such that the injected fluid is distributed across the cross-sectional area of the conduit. Advantageously, this even disbursement is particularly advantageous for exhaust treatment devices such as selective catalyst reduction (SCR) device, diesel oxidation catalyst (DOC), diesel particulate filter (DPF) or otherwise. Due to the even distribution of exhaust gas and injected fluid the exhaust treatment device operates more efficiently as the accumulation or reaction occurs across the entire cross-sectional area of the exhaust treatment device, in a relatively uniform fashion, as compared to a localized accumulation or reaction.

In one exemplary embodiment, these benefits are achieved through the placement of a nozzle within an exhaust gas flow stream of an engine. The nozzle is configured for directing, and increasing the velocity, of a first portion of the exhaust gas flowing through the nozzle. The nozzle is also positioned within the conduit such that a spaced relationship is formed between the nozzle and the conduit. This spaced relationship provides for a second portion of the exhaust gas to flow about the nozzle (e.g., between the nozzle and conduit). The end result is a velocity gradient formed between the first portion of the exhaust gas and the second portion of the exhaust gas causing mixing of the same.

In a first configuration, the nozzle includes a decreasing cross-sectional area forming a first flow path having a first velocity through the nozzle. A spaced relationship between the nozzle and a surrounding conduit forms an increasing cross-sectional area (e.g., between the conduit and exterior surface of the nozzle) forming a second flow path having a second velocity. Due to the narrowing first flow path and expanding second flow path a velocity gradient is formed resulting in mixing of the first and second flow path upon exiting, or flowing past, the nozzle. As described herein, the present invention includes a "nozzle"; however, it should be appreciated that the nozzle functions both as a nozzle that accelerates the fluid (as in the first flow path of this configuration) and as a diffuser that decelerates the gas (as in the second flow path).

Conversely, in a second configuration, the nozzle includes an increasing cross-sectional area forming a first flow path having a first velocity through the nozzle. The spaced relationship between the nozzle and the surrounding conduit forms a decreasing cross-sectional area forming the second flow path having the second velocity. In this embodiment, due to the expansion of the first flow path and contraction of the second flow path a velocity gradient is formed resulting in a mixing of the first and second flow path upon exiting, or flowing past, the nozzle.

The above referenced configurations are particularly advantageous where fluid, such as urea solution or hydrocarbons, are mixed with the slower moving first or second flow path for providing increased mixing and evaporation time of the injected fluid with the slower of the first or second flow path. Upon exiting or flowing past the nozzle, the portion of the exhaust gas including the injected fluid mixes with the other portion of the exhaust gas due to the velocity gradient. It should be appreciated, as described herein, that other features are available for assisting in the mixing of the injected fluid and exhaust gas across a cross-section of the conduit.

In view of the forgoing, referring to FIGS. 1 and 2, a fluid flow control device 10 for an exhaust system 12 of an engine 14 is shown. The fluid flow control device 10 includes a nozzle 16 located within a conduit 18 of the exhaust system 12 for controlling flow of exhaust gas through and after the fluid flow control device 10. The conduit 16 may comprise a portion of an exhaust pipe extending between the engine and an exhaust treatment device 19 or may comprise a conduit configured for attachment to an exhaust pipe or otherwise. The nozzle 16 includes an inlet opening 20 for receiving a first portion of the exhaust gas and an outlet opening 22 for egress of the first portion of exhaust gas from the nozzle. The inlet opening 20 and outlet opening 22 forms a first flow path '$F_1$' through the nozzle 16. The nozzle 16 is attached to the conduit 18 through suitable attachment features 24. In one embodiment, upon attachment, the nozzle 16 is spaced from the conduit 18 to form one or more annular openings 26 located between the nozzle and the conduit. The one or more openings 26 allows for a second portion of the exhaust gas to flow between the nozzle and the conduit to form a second flow path '$F_2$'. The first flow path $F_1$ includes a first velocity $v_1$ and the second flow path includes a second velocity $v_2$. In one exemplary embodiment, the first velocity $v_1$ and the second velocity $v_2$ are different thereby causing a velocity gradient and mixing of exhaust gas traveling through the first and second flow paths. This mixing phenomenon is particularly advantageous during injection of fluids into the slower of the first and second flow paths $F_1$ and $F_2$, such as injection of urea solution or hydrocarbons or other fuels through injector 28, as injected fluid (liquid and vapor) is subsequently mixed with the exhaust gas flowing through the faster of the first and second flow path. The high surface temperature of the nozzle 16, due to the exhaust gas flow, facilitates evaporation of the liquid phase droplets when injected onto the surface of the nozzle.

Figure 5:
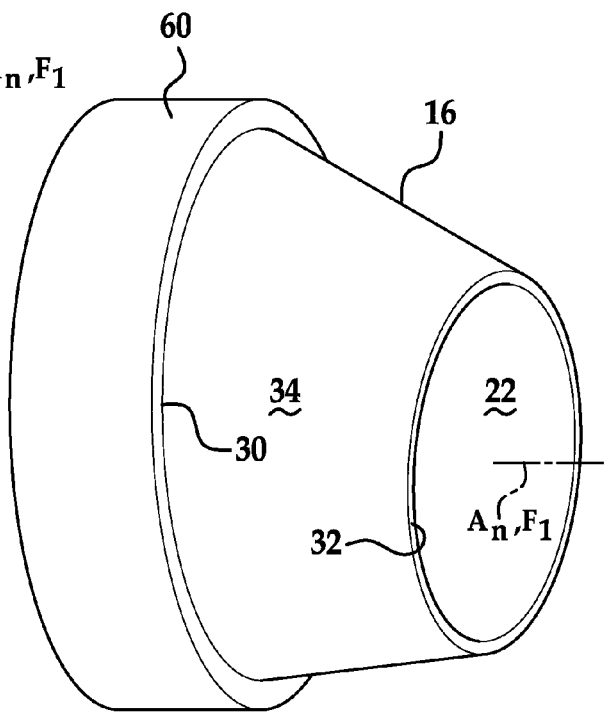
FIG. 5 is a perspective view of a nozzle according to another exemplary embodiment of the present invention.
Figure 6:
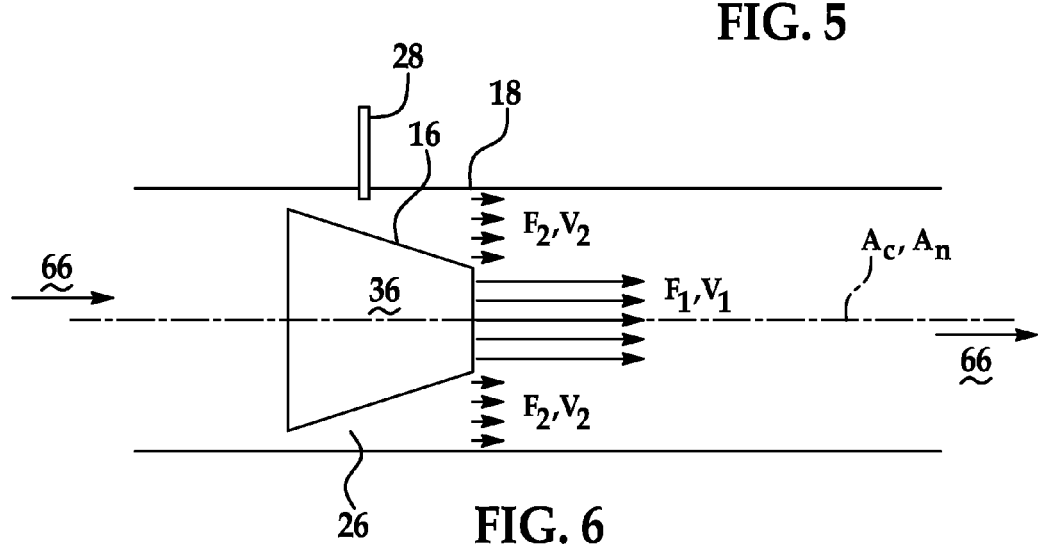
FIGS. 6 through 10 are schematic views of different fluid control devices of the present invention showing fluid flow therethrough according to exemplary embodiments of the present invention.
Figure 7:
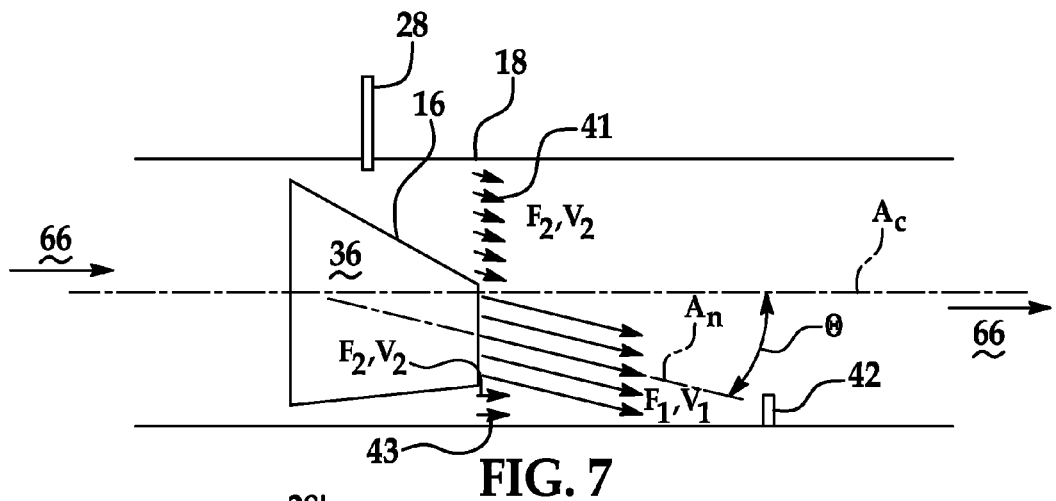

In greater detail, with reference to the nozzle embodiments shown in FIGS. 4, 5 and 6, the nozzle 16 includes a first end 30 defining the inlet opening 20 and a second end 32 defining the outlet opening 22. The nozzle includes one or more annular walls 34 extending from the first end 30 of the nozzle 16 to the second end 32 of the nozzle. The annular wall forms a cavity 36 configured for guiding exhaust flow from the inlet opening 20 to the outlet opening 22 to form the first flow path $F_1$. The nozzle 16 further includes a nozzle axis '$A_n$' extending through a center of the inlet opening 20 and a center of the outlet opening 22. In one embodiment, the nozzle axis $A_n$ is generally parallel to conduit axis '$A_c$'. In another embodiment, shown in FIG. 7, the nozzle axis $A_n$ is non-parallel to the conduit axis $A_c$. In this non-parallel embodiment, the nozzle axis $A_n$ and exhaust gas flowing along the first flow path $F_1$ travels at an angle θ with respect to the conduit axis $A_c$ to intersect conduit 18, a mixing device 42 or otherwise. The angle θ may be configured for causing suitable collision of the first flow path $F_1$ with the second flow path $F_2$, the conduit, the mixing device 42, combinations thereof or otherwise. For example, it is contemplated that the angle θ is between about 0° to 75°, about 5° to 45°, about 10° to 30° or otherwise.

The inlet opening 20 and the outlet opening 22 may comprise any suitable shape. Also, the shape of the inlet opening 20 and the outlet opening 22 may be similar or dissimilar. In one configuration, the inlet opening 20 includes a shape corresponding to an interior portion 38 of the conduit 18 and the outlet opening 22 includes a shape corresponding to the shape of the interior portion 38 of the conduit, the shape of the inlet opening 20 or both. The cross-section of the nozzle normal to its axis $A_n$, at any location on the axis, may be circular, oval, polygon or other desired shape. For example, referring to FIG. 3, in one configuration the shape of the inlet opening and the outlet opening are circular or oval.

Figure 10:
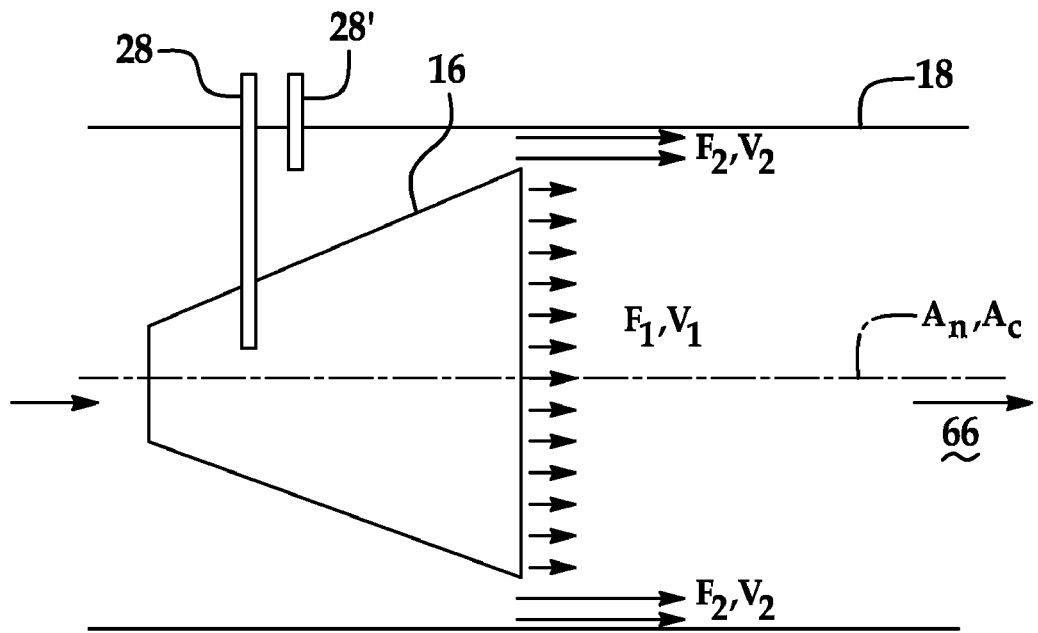

Similarly, the size of the inlet opening 20 and the outlet opening 22 may also comprise any suitable size. This may include diameter size, cross-sectional area or both. However, in one configuration, referring to FIG. 7, the outlet opening 22 is smaller than the inlet opening 20. In this configuration, the velocity $v_1$ of the of the exhaust gas flowing through the nozzle, and along the first flow path $F_1$ increases due to the narrowing restricted outlet opening 20. In another configuration, referring to FIG. 10, the inlet opening 20 is smaller than the outlet opening 22. In this configuration, the velocity $v_1$ of the of the exhaust gas flowing through the first flow path $F_1$ decreases due to the expanding outlet opening. Similarly, the inlet and outlet planes of the nozzle can be at any desired angle with respect to the nozzle axis, $A_n$.

In one exemplary embodiment, the annular wall 34 includes one or more openings for allowing fluid flow between the first flow path $F_1$ and the second flow path $F_2$. Such openings may comprise circular openings, slots or otherwise and may be located anywhere along a length of the nozzle 16. For example, with reference to FIG. 4, a plurality of circular openings 38 are located proximate to a location of an injector and a plurality of slot openings 40 are located opposite the injector. In this configuration, a portion of the fluid injected by the injector 28 enters circular openings 38 to travel along the first flow path $F_1$. As can be appreciated, this open communication provides additional mixing of exhaust gas traveling through the nozzle 16 and may provide reduced back pressure. The location and size of the openings 38 may be optionally designed to produce swirling motion in the exhaust gas flow to enhance mixing and evaporation.

Figure 8:
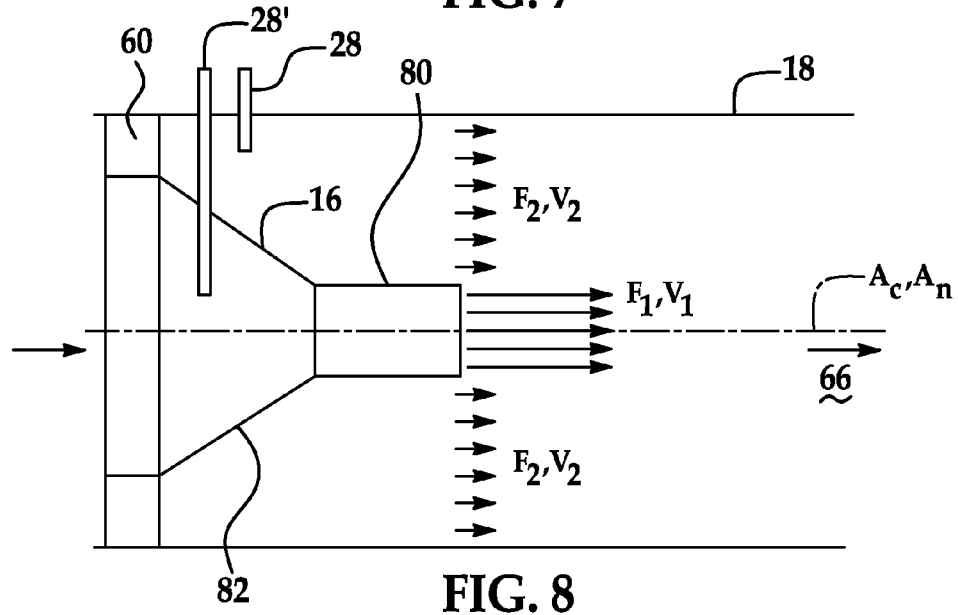
Figure 9:
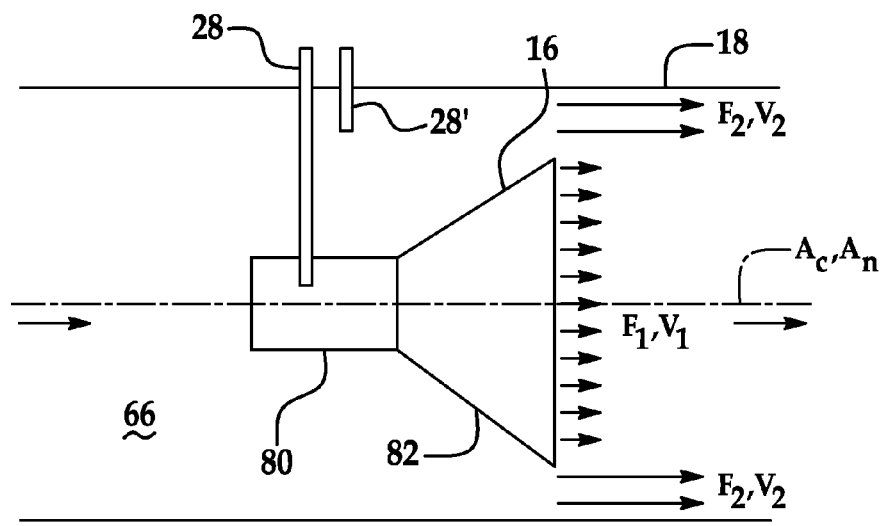

The shape of the nozzle 16 may comprise any suitable shape to achieve desired velocity gradient between the first flow path $F_1$ and the second flow path $F_2$. The shape or orientation of the nozzle 16 may also be suitable to cause further mixing of the first and second flow paths $F_1$ $F_2$ Such additional mixing can be achieved by directing fluid flow towards the conduit 18, mixing device 42 or otherwise generating tumbling motion in the flow. With respect to the shape of the nozzle 16, the nozzle may be symmetrical (e.g. frustum of a regular or symmetric hollow cone) or asymmetrical (e.g. frustum of an irregular or asymmetric hollow cone). The orientation of the nozzle may be symmetrical along one or more axes or planes. For example, as shown in FIGS. 6 and 8-10, the nozzle 16 is symmetrical in shape and is oriented along two axes or planes causing fluid flow in the direction of the conduit axis $A_c$. In another example, referring to FIG. 7, the nozzle 16 can be symmetrical or asymmetrical in shape but oriented along a single axis $A_n$ causing fluid flow towards the conduit wall 18 and a mixing device 42. In another configuration, the nozzle may be symmetrical along two axes, as shown in any of FIGS. 6 and 8-10, but orientated in a direction intersecting conduit wall 18, mixing device 42 or otherwise. The nozzle 16 may also include one or more geometrical or non-geometrical shapes for forming suitable fluid flow. For example, the nozzle may be formed of or include a cylindrical portion 80 (FIG. 9). The nozzle may also be formed of or include conical or frustroconical portion 82. Still further, the nozzle may include a combination of geometric shapes such as cylindrical portion 80 and a frustroconical portion 82. The nozzle may also be cast or fabricated.

In view of the forgoing, referring to FIGS. 2, 3 and 6, a first nozzle configuration is shown. In this configuration a symmetrical frustroconical shaped nozzle 16, symmetrical along two axes, is provided having nozzle axis $A_n$ and the first flow path $F_1$ extending generally parallel to conduit axis $A_c$. In another configuration, referring to FIGS. 4, 5 and 7, a second nozzle configuration is shown. In this configuration, a skewed or tilted frustroconical shaped nozzle 16 which is symmetrical along a single axis, is provided having nozzle axis $A_n$ and the first flow path $F_1$ extending in a direction non-parallel to conduit axis $A_c$. In another configuration, referring to FIG. 8, the nozzle 16 includes a frustroconical portion 82 joined to a cylindrical portion 80, wherein fluid flow through the frustroconical portion 82 enters into the cylindrical portion 80. In this configuration, the nozzle is symmetrical along two axes and provides a nozzle axis $A_n$ and the first flow path $F_1$ extending generally parallel to conduit axis $A_c$. In another configuration, referring to FIG. 9, a similar configuration to FIG. 8 is provided; however, fluid flow is through cylindrical portion 80 and then the frustroconical portion 82. In this configuration, the nozzle is symmetrical along two axes and provides a nozzle axis $A_n$ and the first flow path $F_1$ extending generally parallel to conduit axis $A_c$. In still another configuration, referring to FIG. 10, a similar configuration to FIG. 9 is provided, but without cylindrical portion 80. In this configuration, the nozzle is symmetrical along two axes and provides a nozzle axis $A_n$ and the first flow path $F_1$ extending generally parallel to conduit axis $A_c$. It should be appreciated as shown and described herein that still other configurations are possible and the exact choice of the nozzle shape and dimensions may be driven by performance, cost, packaging etc.

With respect to the second flow path $F_2$, the second flow path may extend in one or more directions depending on the configurations of the opening 26 formed between the nozzle 16 and conduit 18. The direction of the second flow path may be formed for intersection with the first flow path $F_1$, the conduit 18, mixing device 42, combinations thereof or otherwise. The second flow path $F_2$ may extend parallel to the axis $A_n$ of the nozzle 16, the axis $A_c$ of the conduit 18 or both. Alternatively, the second flow path $F_2$ may be non-parallel to the axis $A_n$ of the nozzle, the axis $A_c$ of the conduit or both. For example, with reference to FIG. 6, the flow path through opening 26 comprises a generally uniform flow path that is generally parallel with the first flow path $F_1$, nozzle axis $A_n$ and conduit axis $A_c$. Alternatively, with reference to FIG. 7, the second flow path $F_2$ includes a first portion 41 that is generally parallel to the first flow path $F_1$ and nozzle axis $A_n$, and parallel to the conduit axis $A_c$. The second flow path $F_2$ also includes a second portion 43 that is non-parallel to the first flow path $F_1$ and nozzle axis $A_n$, but parallel to the conduit axis $A_c$. Accordingly, it should be appreciated that various mixing occurs as a result of impact between the first and second flow paths $F_1$, $F_2$ and the conduit 18.

In the configurations shown in FIGS. 6-10, the conduit 18 included a generally constant cross-section area and shape. Accordingly, with reference to the embodiment shown in FIG. 6, the cross-sectional area of the second flow path $F_2$, consisting of the annular space between the nozzle 16 and the conduit 18, increases in the flow direction, causing a diffuser effect along the second flow path. In contrast, referring to the embodiment shown in FIG. 10, a decreasing cross-sectional area of the second flow path $F_2$ may be formed, wherein the second velocity $v_2$ of the second flow path increases. However, the conduit 18 is not limited to a constant diameter or cross-sectional area conduit but can also be formed having changing or particularly designed diameter or cross-sectional area.

Figure 16:
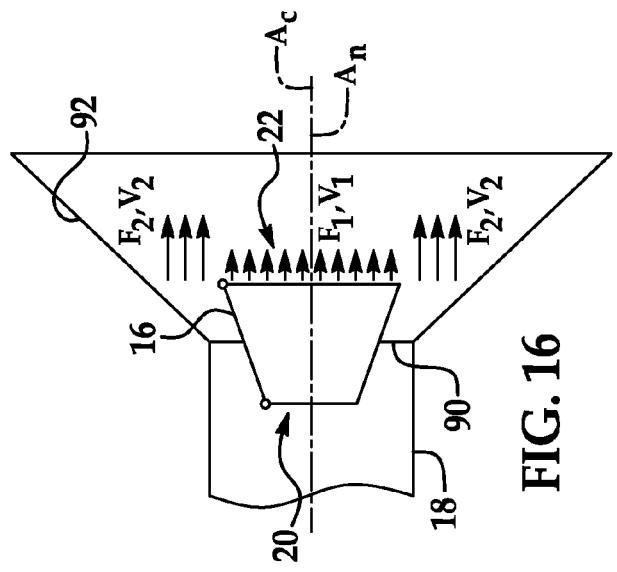
FIG. 16 illustrates a cross-sectional view of a fluid control device according to still another exemplary embodiment of the present invention.

For example, in one exemplary embodiment, the conduit 18 may comprise all or a portion of another exhaust component, such as an exhaust treatment device 19. As previously mentioned, such exhaust treatment devices may comprise a selective catalyst reduction (SCR) device, diesel oxidation catalyst (DOC), diesel particulate filter (DPF) or otherwise. Accordingly, the nozzle 16 may be disposed within all or a portion of the exhaust treatment device 19 or before the exhaust treatment device. As an example, with reference to FIG. 16, the fluid control device 10 includes a nozzle 16 that is placed within an inlet opening 90 of the exhaust treatment device 19. In this configuration, the nozzle 16 includes inlet opening 20 and an outlet opening 22 to form the first flow path $F_1$ and the first velocity $v_1$. The cross-sectional area formed between the nozzle 16 and an annular wall 92 of the exhaust treatment device 19 forms the second flow path $F_2$ and the second velocity $v_2$, wherein due to the decreasing cross-sectional area, the second velocity $v_2$ is greater than the first velocity $v_1$.

Figure 17:
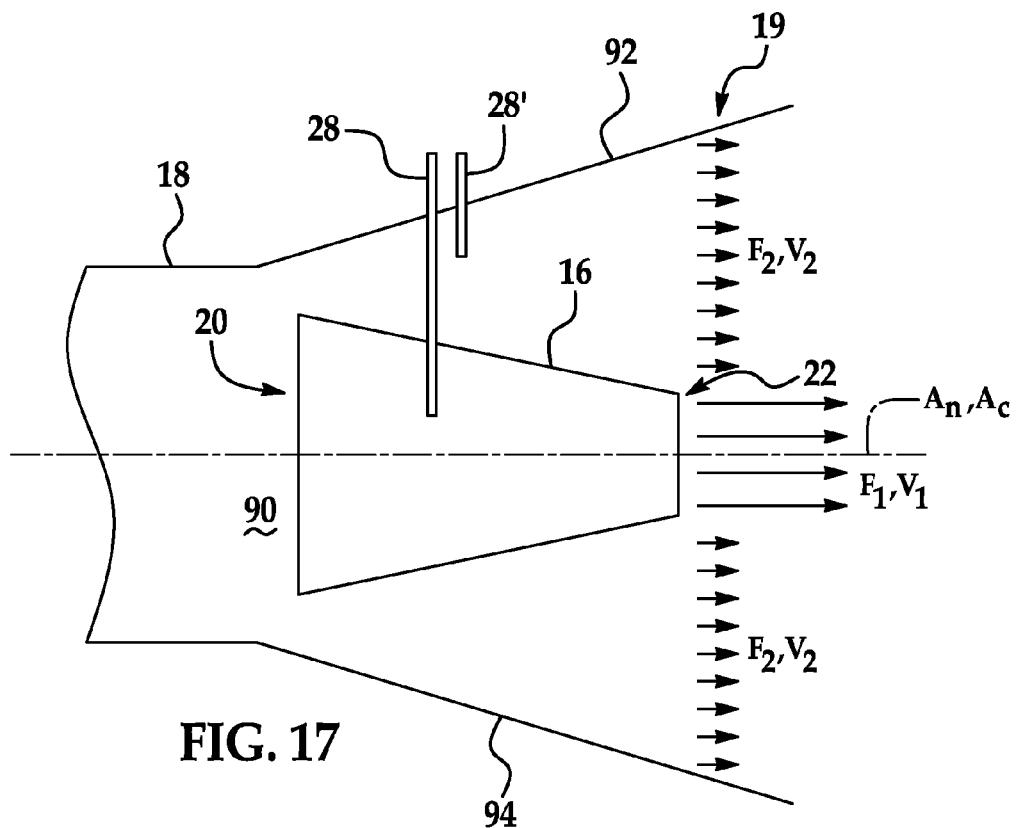
FIGS. 17 through 20 are schematic views of different fluid control devices of the present invention showing fluid flow therethrough according to exemplary embodiments of the present invention.
Figure 18:
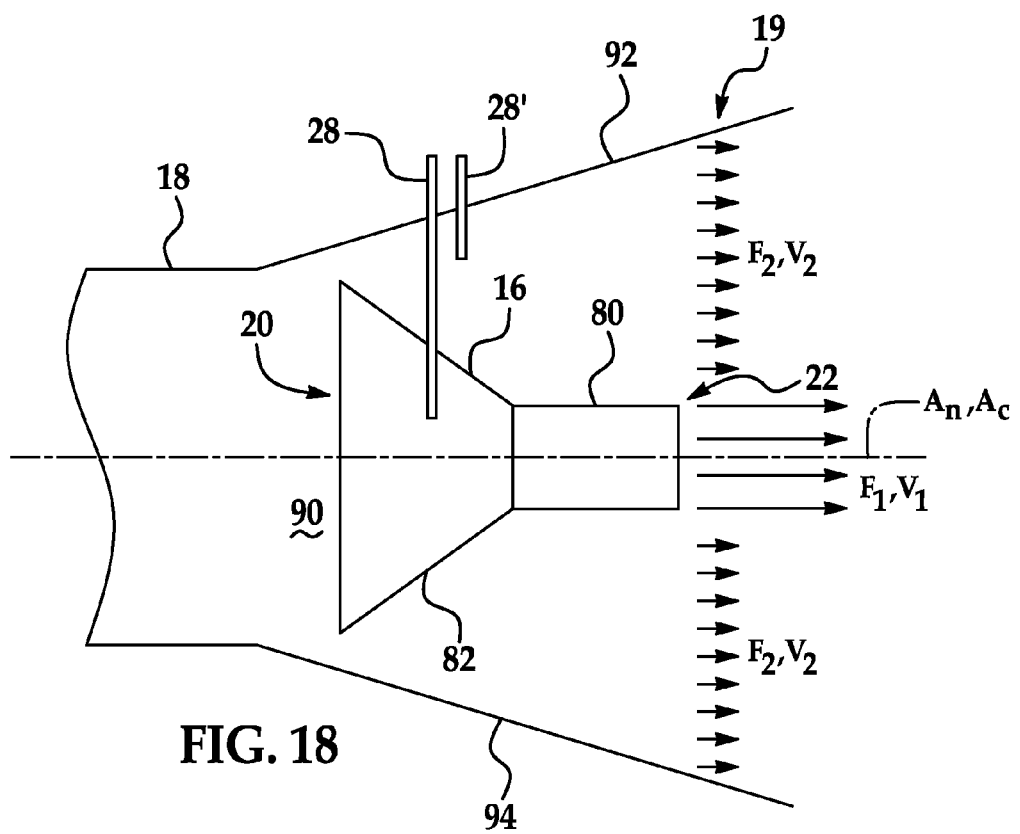
Figure 19:
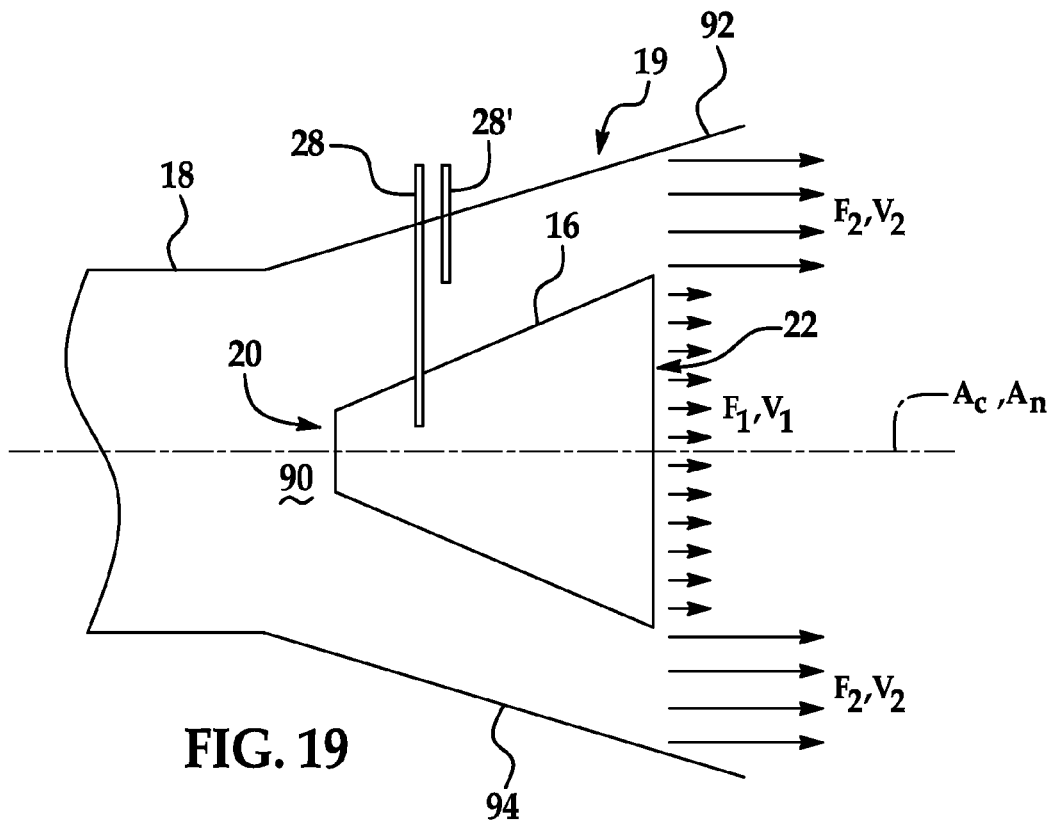
Figure 20:
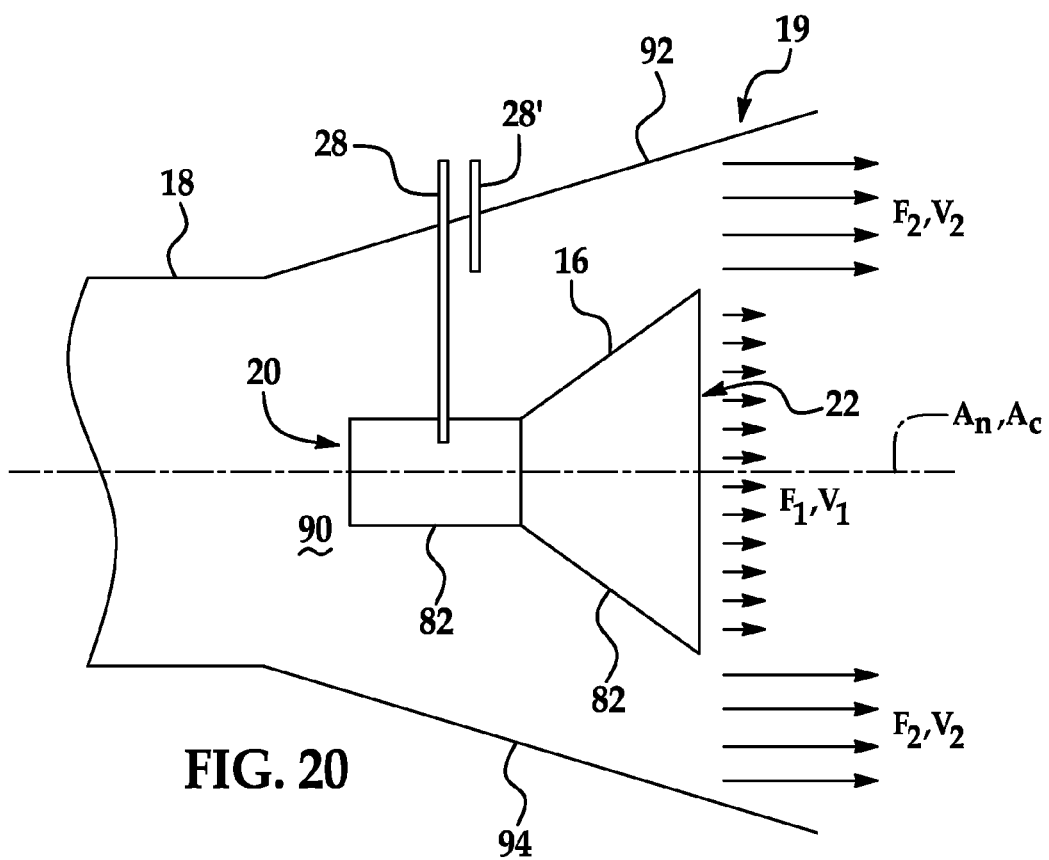

In another example, referring to FIG. 17, a fluid control device 10 including a nozzle 16 placed within an exhaust treatment device is shown. In this configuration, the nozzle 16 is completely disposed within a frustroconical inlet portion 94 of the exhaust treatment device 19. The nozzle 16 includes an inlet opening 20 having a greater cross-sectional area greater than an outlet opening 22 to form the first flow path $F_1$ and first velocity $v_1$. The cross-sectional area formed between the nozzle 16 and the frustroconical inlet portion 94 of the exhaust treatment device 19 forms the second flow path $F_2$ and the second velocity $v_2$. Due to the increasing cross-sectional area of the second flow path $F_2$ and decreasing cross-sectional area of the first flow path $F_1$, the second velocity $v_2$ is less than the first velocity $v_1$. As shown, the fluid control device may include one or more injectors 28, 28' for injection of fluid in the first flow path $F_1$, second flow path $F_2$ or both. In another example, referring to FIG. 18, the nozzle 16 is formed of a cylindrical portion 80 and a frustroconical portion 82. In still other examples, referring to FIGS. 19 and 20, similar configurations to that of FIGS. 17 and 18 are shown, respectfully. In these configurations, the cross-sectional area of the inlet openings 20 are smaller than the cross-sectional areas of the outlet openings 22 thereby forming a first velocity $v_1$ that is less than the second velocity $v_2$. In the configurations shown in FIGS. 16 through 20 the conduit axis $A_c$ is generally parallel with the nozzle axis $A_n$. However, it should be appreciated that the conduit axis $A_c$ and nozzle axis $A_n$ may be non-parallel, e.g., at an angle θ.

Figure 11:
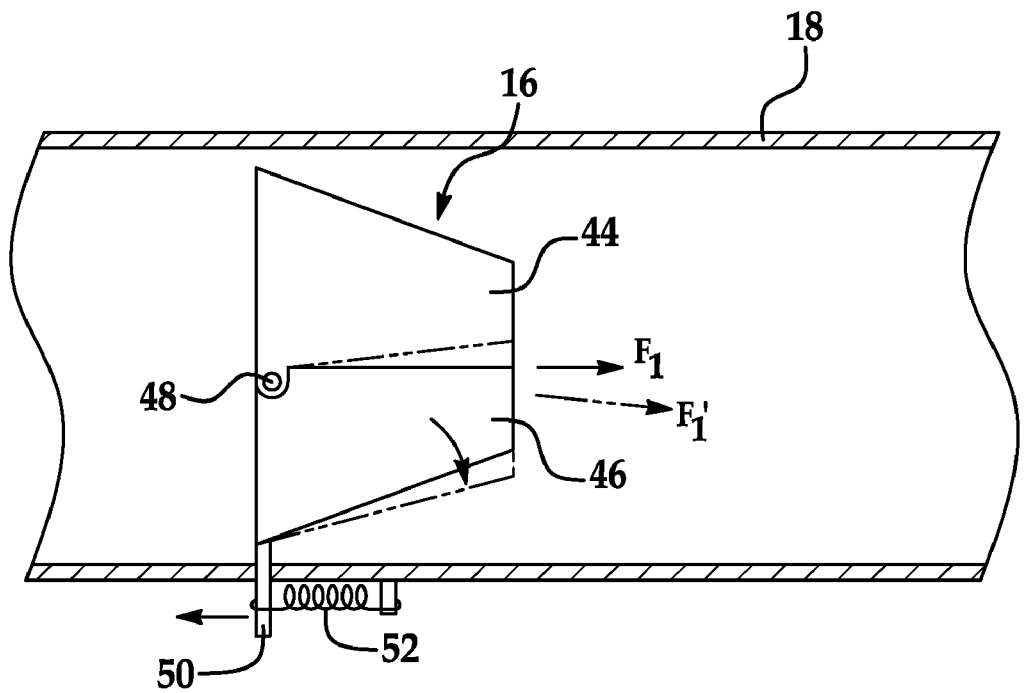
FIG. 11 illustrates a cross-sectional view of a fluid control device according to another exemplary embodiment of the present invention.

The exemplary embodiments of the nozzle shown in FIGS. 4 and 5 illustrate a generally fixed shaped nozzle 16. However, in one exemplary embodiment, referring to FIG. 11, it is contemplated that the shape of the nozzle 16 is adjustable. Computational fluid dynamic (CFD) studies have consistently shown a higher fluid pressure on the inside of the nozzle relative to the outside of the nozzle, wherein the difference becomes greater at higher flow rates of the exhaust gas. Accordingly, adjustable nozzles can be used to lower fluid pressure and back pressure. In this embodiment, the nozzle 16 becomes a variable geometry nozzle. For example, the nozzle 16 includes an upper portion 44 and a lower portion 46, wherein the upper portion is moveable with respect to the lower portion. Movement of the upper portion with respect to the lower portion may be achieved through a pivotal connector 48 located at the first end of the nozzle 16. The lower portion 46 of the nozzle 16 includes a control member 50 extending through conduit 18 for movement of the lower portion 46. Further, a resilient member 52 may be provided for returning the nozzle 16 to an original or previous configuration. In this embodiment, it should be appreciated that the first flow path $F_1$ and nozzle axis $A_n$ may be adjusted to a modified first flow path $F_1'$ prior to or during use of the engine to obtain a desired mixing configuration. This adjustment may be adjusted based upon flow rate of exhaust gas flowing through the nozzle 16 and may be automated through a controller, such as an engine control unit or otherwise.

Figure 12A:
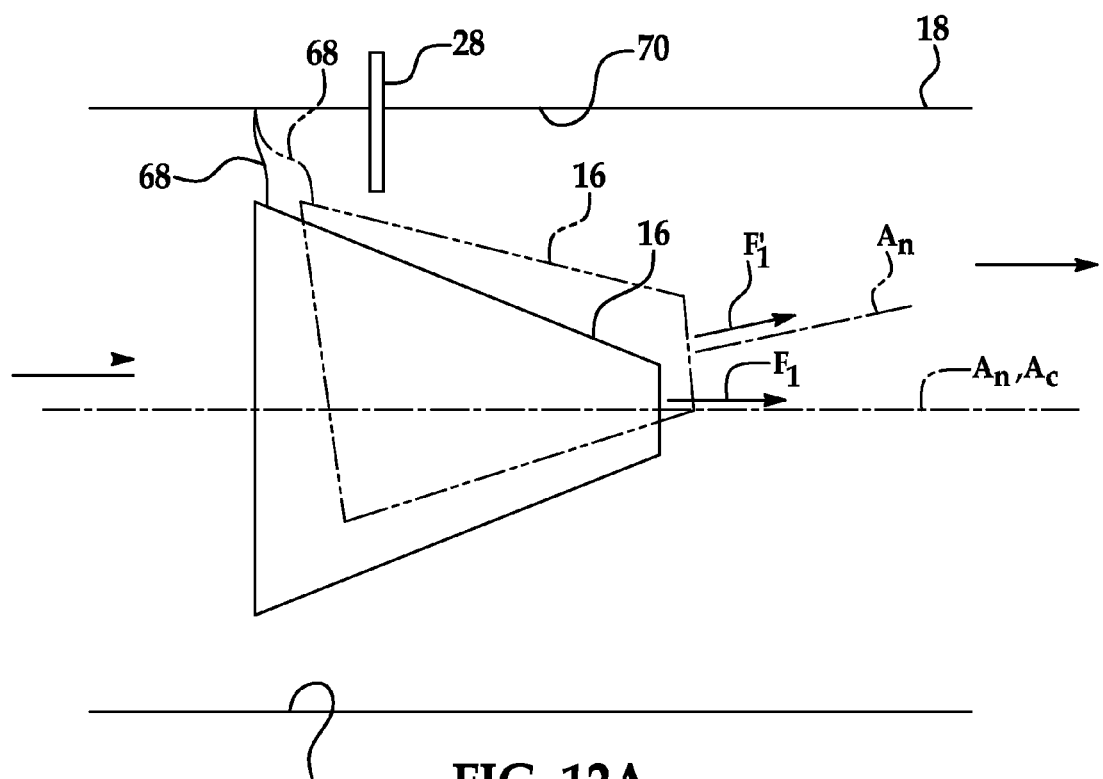
FIG. 12A illustrates a cross-sectional view of a fluid control device according to yet another exemplary embodiment of the present invention.
Figure 12B:
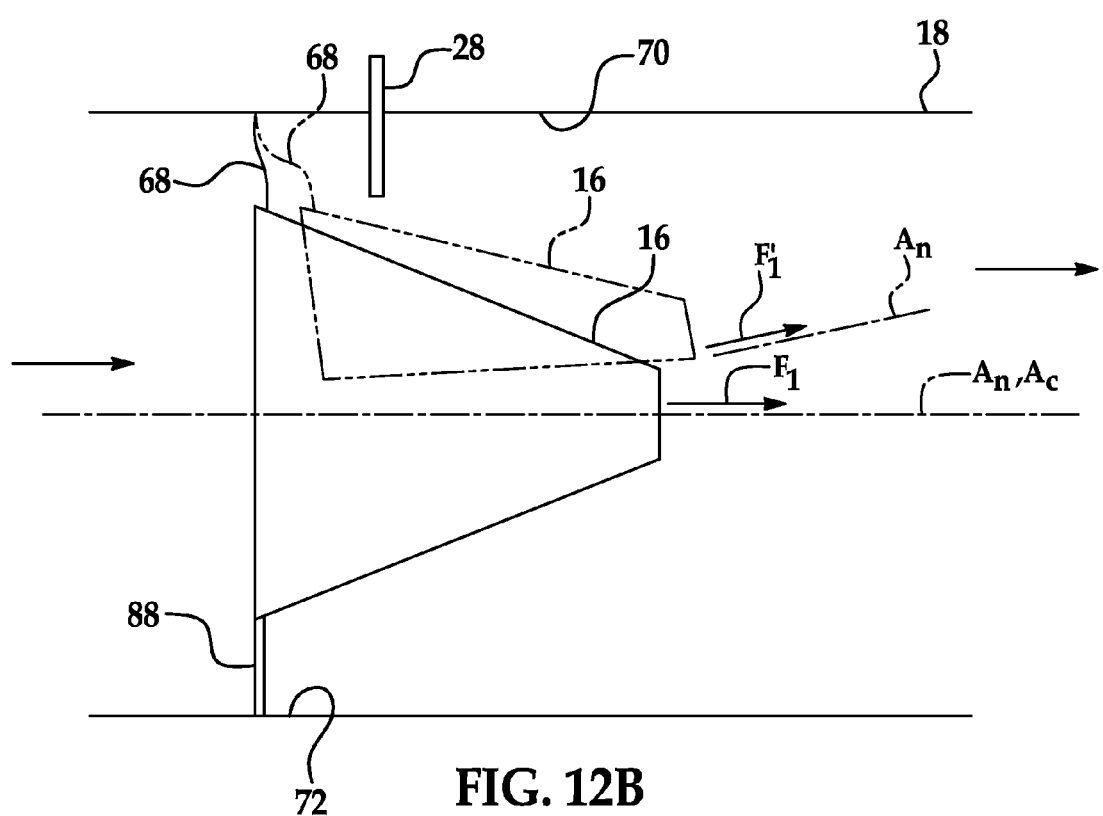
FIG. 12B illustrates a cross-sectional view of a fluid control device according to still another exemplary embodiment of the present invention.

In an alternative embodiment, referring to FIGS. 12A and 12B, deflectable or moveable nozzles 16 are provided for reducing initial backpressure within the exhaust system. The moveable nozzle includes one or more leaf springs 68 made of metal strips welded to nozzle 16 and attached to the exhaust conduit 18 at a top portion 70 and/or bottom portion 72. With reference to FIG. 12A, the nozzle 16 is suspended by leaf spring 68, which will enable the entire nozzle, as a single member, to move laterally normal to its axis during higher exhaust gas flow rates as a means of lowering backpressure formed thereby. In configurations where the nozzle has slots, lateral motion that increases the annular space between the slots and the conduit will reduce flow resistance and pressure drop. In an alternative embodiment, referring to FIG. 12B, the reduction in backpressure is achieved through nozzle 16 having an upper portion 84 and a lower portion 86, wherein the upper portion is moveable with respect to the lower portion. In this configuration, the lower portion 86 is rigidly mounted to the bottom portion 72 conduit 18, through rigid member 88, and the upper portion 84 is moveably mounted to the top portion 70 of conduit 18, through the leaf spring 68. Movement of the upper portion 84 relative to the lower portion 86 is achieved through leaf spring 68.

Figure 13:
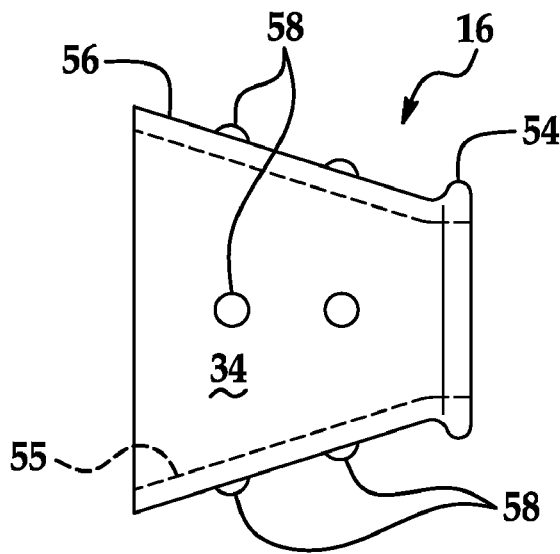
FIG. 13 illustrates a side view of a nozzle according to another exemplary embodiment of the present invention.
Figure 14A:
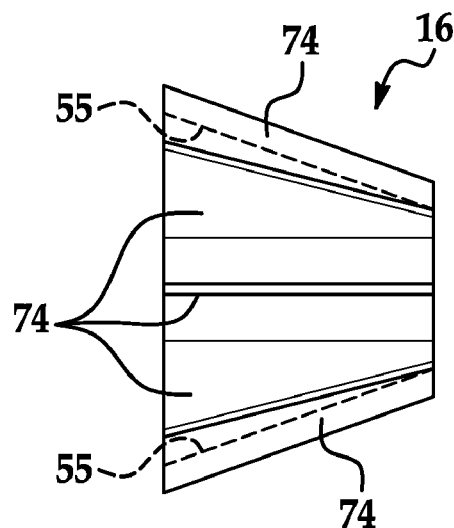
FIG. 14A illustrates a side view of a fluid control device according to yet another exemplary embodiment of the present invention.
Figure 14B:
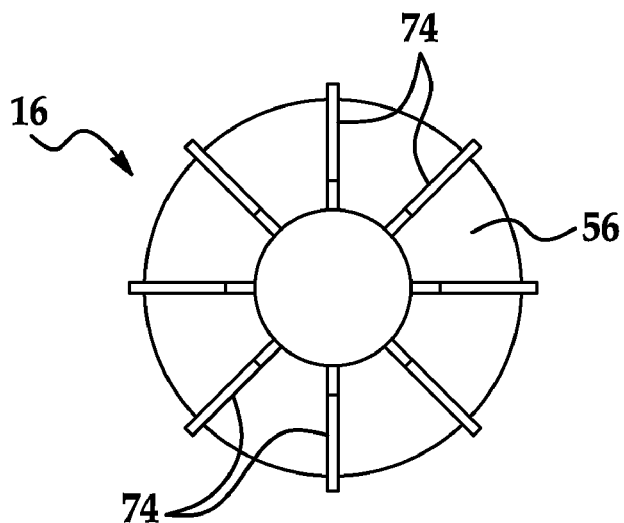
FIG. 14B illustrates a front view of the fluid control device shown in FIG. 14A.

The nozzle 16 may be further modified to achieve further control of mixing of the first flow path $F_1$ and second flow path $F_2$. For example, the nozzle may include one or more flow modifiers located on an interior portion 55 or exterior portion 56 of the annular wall 34. In one exemplary embodiment, referring to FIG. 13, a flow modifier comprises a lip 54 located at the second end 32 of the nozzle 16 and on an exterior portion 56 of the annular wall 34. The lip 54 can also be located at the inlet or first end 30 of the nozzle (not shown). In another configuration, one or more projections or dimples 58 or fins 74 (see FIGS. 14A and 14B) are located along the interior or exterior portion 55, 56 of the annular wall 34. Alternatively, cuts or grooves (not shown) may be formed extending inwardly from the inlet opening 20, outlet opening 22, or both, for providing further mixing. Further, nozzle 16 could be formed of a convoluted member. The inlet and outlet of the nozzle may be chamfered or otherwise shaped to form a desired fluid flow effect or otherwise. Other configurations are possible.

Attachment of the nozzle 16 to the conduit 18 may be achieved in any suitable manner. In one configuration, attachment of the nozzle 16 to conduit 18 is achieved through welding the nozzle directly to the conduit. In another configuration, one or more attachment features (e.g., mechanical fasteners or otherwise) may be used for attachment of the nozzle to the conduit. For example, with reference to FIGS. 3 and 4, attachment feature 24 is provided for attachment of the nozzle 16 to conduit 18 at one or more locations. The resulting attachment creates a spaced relationship between the nozzle 16 and the conduit 18 for forming the second flow path $F_2$.

In another configuration, referring to FIG. 5, attachment of the nozzle 16 to the conduit 18 may be achieved through a porous member 60. Here the porous medium occupies the annular space between the nozzle 16 and the conduit 18 for a short axial distance at the inlet opening 20. In this configuration, the porous member includes a plurality of openings formed therethrough for allowing exhaust gas to flow therethrough for further forming the second fluid flow path $F_2$. The porous member 60 may be formed of any material resilient to exhaust temperatures of an engine. In one configuration, the porous material is formed of ceramic or metal foam. The porous material may be attached to the nozzle and conduit through any suitable means such as mechanical fasteners, high temperature adhesive, welding in certain circumstances or otherwise. The porous material produces a relatively uniform velocity distribution entering the second flow path. This together with the reduced flow velocities in the second flow path will result in more residence or occupancy time for injection and distribution of liquid droplets within the second flow path $F_2$ thereby increasing evaporation and mixing time. The use of a porous media in this manner enhances mixing and evaporation of fluid as seen in computational fluid dynamics (CFD) studies.

Referring to FIGS. 6 through 10, the fluid control device 10 further contemplates the use of one or more injectors 28, 28' for injection of fluid (e.g., urea solution, hydrocarbon fuel or otherwise) into the exhaust stream. The one or more injectors 28, 28' forms pressurized fluid that is injected into the first flow path $F_1$, second flow path $F_2$, or both. Accordingly, the one or more injectors 28, 28' may extend through an opening formed through annular wall 34 of nozzle 16. In one particular configuration, an injector 28 is provided for injecting fluid into the slower of the first and second flow paths $F_1$, $F_2$, to allow increased mixing and vaporization time within the slower moving fluid. However, it is also contemplated that the injector may inject fluid within the faster of the first and second flow paths $F_1$, $F_2$. Still further, it is contemplated that the fluid control device injects fluid in both of the first and second flow paths $F_1$, $F_2$. It should be appreciated that the spray characteristics, e.g., flow rate, velocity, pattern or otherwise, may vary between injector 28 and injector 28'.

In one non-limiting configuration, referring to FIGS. 2 and 3, the injector 28 is orientated to direct a pressurized fluid to intersect the nozzle 16. In this configuration, injected fluid impacts the nozzle 16 to cause vaporization of the injected fluid due to the velocity of the fluid and temperature of the nozzle. The injected fluid then travels along the second flow path $F_2$ where it mixes within the second flow path and with the first flow path $F_1$. The angle of the injector with respect to the nozzle wall may be varied to achieve a desired vaporization and mixing results. It should be appreciated that fluid injected through the injector 28 or injector 28', may be positioned and orientated for a desired impact with the interior portion 55 or the exterior portion 56 of annular wall 34.

Figure 15:
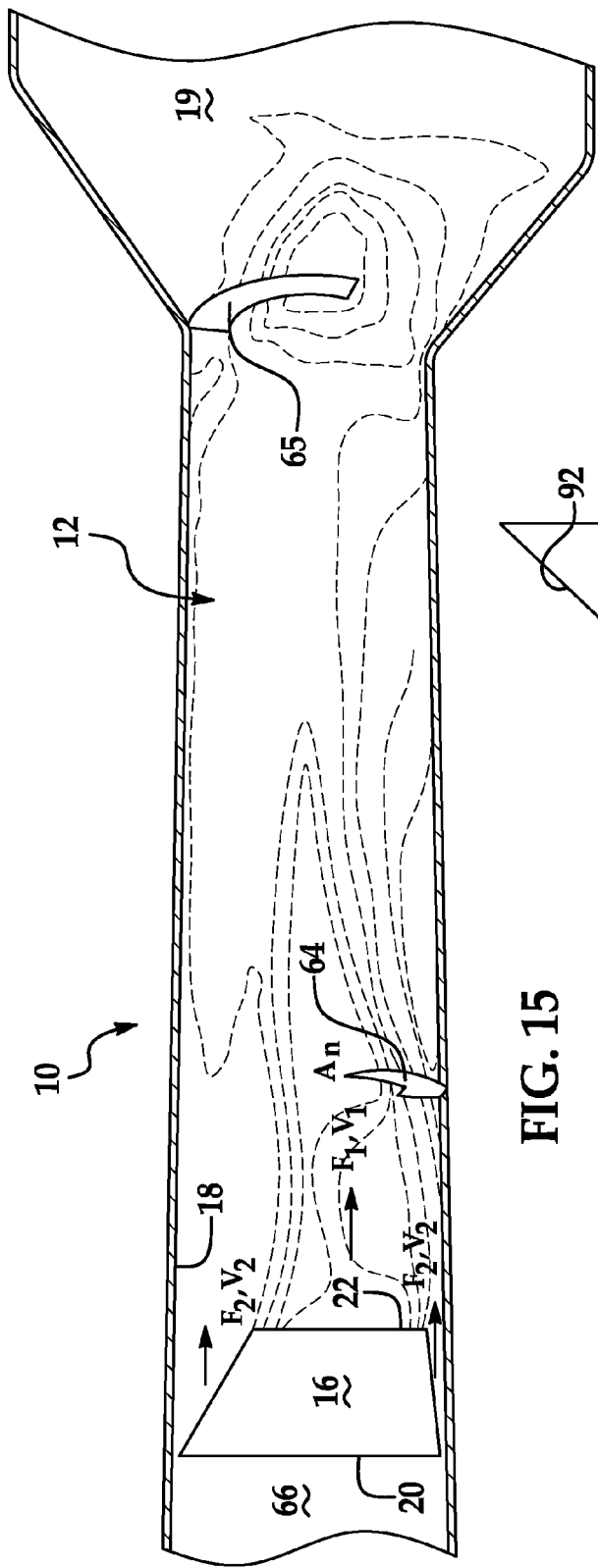
FIG. 15 illustrates a cross-sectional view of an exhaust system and a fluid control device according to an exemplary embodiment of the present invention.

In one exemplary embodiment, the fluid control device 10 further includes one or more mixing devices 42 located downstream from the nozzle for mixing the exhaust gas and/or exhaust gas with the injected fluid from injector 28. Such mixing devices may comprise washers, half washers, deflectors, exhaust flow mixers, swirl devices, perforated or non-perforated plates or otherwise. For example, referring to FIG. 15, two half washer mixing devices 64, 65 are shown. In this configuration, the nozzle axis $A_n$ is orientated towards the conduit 18 and the first half washer mixing device 64. The exhaust gas from the first and second flow paths $F_1$, $F_2$ impact the first half washer causing the exhaust gas upwards towards the second half washer mixing device 65. Upon impact with the second half washer mixing device 65, the exhaust gas is directed downward. The resulting exhaust flow to the exhaust treatment device 19 is a generally an even distribution of exhaust gas and vapors as well as the exhaust gas and unevaporated liquid droplets of the injected liquid to the exhaust treatment device 19 thereby forming a third flow path and velocity.

Exemplary embodiments of the fluid control device 10 maybe used in different engine applications including gasoline engines, diesel engines, hybrid engine, flex fuel engine or otherwise. Also it is contemplated that the fluid control device 10 may be used for one or more of the exhaust treatment devices of these engines. For example, the fluid control device may be used to provide a generally uniform pattern of exhaust gas, including urea or fuel vapor and/or droplets, to selective catalyst reduction (SCR) device, diesel oxidation catalyst (DOC), diesel particulate filter (DPF), combinations thereof or otherwise. Another exemplary embodiment, multiple nozzles 16 are placed in an exhaust flow of an exhaust system, wherein the additional nozzles provides further mixing of the injected fluid (unevaporated liquid and vapor) with the exhaust gas. This will be analogous to using exhaust flow mixers, swirl devices, perforated plates etc. or even a small pipe within the exhaust conduit to augment the mixing and evaporation achieved by a single nozzle. These multiple nozzles may be placed in series or interposed by other components, such as exhaust treatment devices or otherwise.

Key attributes of the fluid control device 10 are to divide the exhaust gas flow into two or more flow paths, wherein one accelerates the exhaust gas flow as a nozzle and the other decelerates the exhaust gas flow as a diffuser, and wherein injection of a liquid into the slow moving gas, or the diffuser region, is performed to increase its residence or occupancy time therein and therefore increase evaporation and mixing within the exhaust gas stream. However, it should be appreciated that the scope of this invention also includes the injection of the gas or liquid into either the diffuser section, the nozzle section or both in order to adapt to particular situations, mixing and packaging targets. The scope of this invention also includes configurations wherein one of the paths accelerates or decelerates the exhaust gas (as in a nozzle or diffuser configuration), while the other path does neither. The two flow paths with different velocities reunite upon exiting or traveling past the nozzle and mixes. Also, certain embodiments, such as a variable geometry nozzle with or without leaf springs, can lower back pressure within the exhaust system of the engine. The nozzle and conduit can also be designed (e.g., shaped, sized or otherwise configured) to optimize the tradeoffs among mixing, evaporation, back pressure, packaging, cost etc.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A fluid flow control device for receiving and guiding exhaust gas from an engine towards an exhaust gas treatment device, comprising:
   a nozzle disposed within an exhaust conduit of the engine, the nozzle including an inlet opening and an outlet opening for forming a first flow path through the nozzle, the nozzle being spaced from the exhaust conduit for forming a second flow path between the nozzle and the exhaust conduit; and
   an injector disposed adjacent the nozzle, the injector being oriented to direct a pressurized fluid into the second flow path;
   wherein the first flow path forms a first axis and the exhaust conduit, along an axial length where the nozzle is disposed within the exhaust conduit, forms a second axis, the first axis and second axis being non-parallel with respect to one another.

2. The fluid flow control device of claim 1, wherein the pressurized fluid is directed to intersect the nozzle.

3. The fluid flow control device of claim 2, wherein the nozzle is at least partially frustoconical in shape.

4. The fluid flow control device of claim 1, wherein the pressurized fluid directed by the injector comprises urea solution or hydrocarbon fuel.

5. The fluid flow control device of claim 1, further comprising a porous material disposed adjacent to the inlet opening of the nozzle, the porous material forms a portion of the second flow path.

6. The fluid flow control device of claim 1, wherein the first flow path through the nozzle includes an axis that intersects the conduit.

7. The fluid flow control device of claim 1, wherein the nozzle includes one or more openings formed through an annular wall, the one or more openings being configured to provide fluid flow between the first and second flow paths.

8. An exhaust gas treatment system for an engine, comprising:
    an exhaust gas treatment device;
    a fluid flow control device located upstream from at least a portion of the exhaust gas treatment device, the fluid flow control device including: a nozzle disposed within an exhaust conduit, the nozzle including an inlet opening and an outlet opening for forming a first flow path through the nozzle, the nozzle being spaced from the exhaust conduit for forming a second flow path between the nozzle and the exhaust conduit; and
    an injector disposed adjacent the nozzle of the fluid flow control device, the injector being oriented to direct a pressurized fluid into the second flow path adjacent to the nozzle;
    wherein, the nozzle defines a first axis and the exhaust conduit, along an axial length where the nozzle is disposed within, defines a second axis, and the first axis and second axis intersect each other.

9. The exhaust gas treatment system of claim 8, wherein the exhaust gas treatment device comprises selective catalyst reduction device and the pressurized fluid directed by the injector comprises urea solution.

10. The exhaust gas treatment system of claim 8, wherein the exhaust gas treatment device comprises diesel particulate filter and the pressurized fluid directed by the injector comprises hydrocarbon fuel.

11. The fluid flow control device of claim 8, further comprising a mixing device located down stream from the nozzle, the first or second flow path intersecting the mixing device.

12. A method of dispersing an exhaust gas stream within an exhaust gas conduit of an engine, comprising:
    flowing a first portion of the exhaust gas through a nozzle disposed within the exhaust gas conduit to form a first flow path having a first axis, the nozzle including an inlet opening and an outlet opening;
    flowing a second portion of the exhaust gas stream between the nozzle and the exhaust gas conduit to form a second flow path having a second axis;
    injecting pressurized fluid into the second flow path; and
    the first portion of the exhaust gas, the second portion of the exhaust gas and the injected fluid combining upon passing the nozzle to form a mixture;
    wherein, along an axial length of the exhaust conduit where the nozzle is disposed within, the first axis of first flow path and the second axis of the second flow path are non-parallel with respect to each other.

13. The method of claim 12, wherein upon exiting the nozzle the first portion of the exhaust gas and the second portion of the exhaust gas have different velocities.

14. The method of claim 13, wherein the first axis of the first flow path of the exhaust gas intersects the second portion of the exhaust gas.

15. The method of claim 13, wherein the first axis of the first flow path of the exhaust gas intersects the exhaust gas conduit.

16. The method of claim 12, wherein the pressurized fluid is directed to intersect the nozzle.

17. The method of claim 12, further comprising the step of flowing the mixture into an exhaust gas treatment device.

18. The method of claim 17, wherein the step of injecting fluid comprises injecting a urea solution or hydrocarbon fuel into the second flow path to cause vaporization of the urea solution or hydrocarbon fuel.

* * * * *